Aug. 16, 1966     K. E. SUNDSTROM     3,266,504
AUTOMATIC TITRATOR
Filed Oct. 15, 1962     3 Sheets-Sheet 1

Fig. 1.

INVENTOR.
KARL ERIK SUNDSTROM
BY HIS ATTORNEYS
HARRIS, KIECH, RUSSELL & KERN

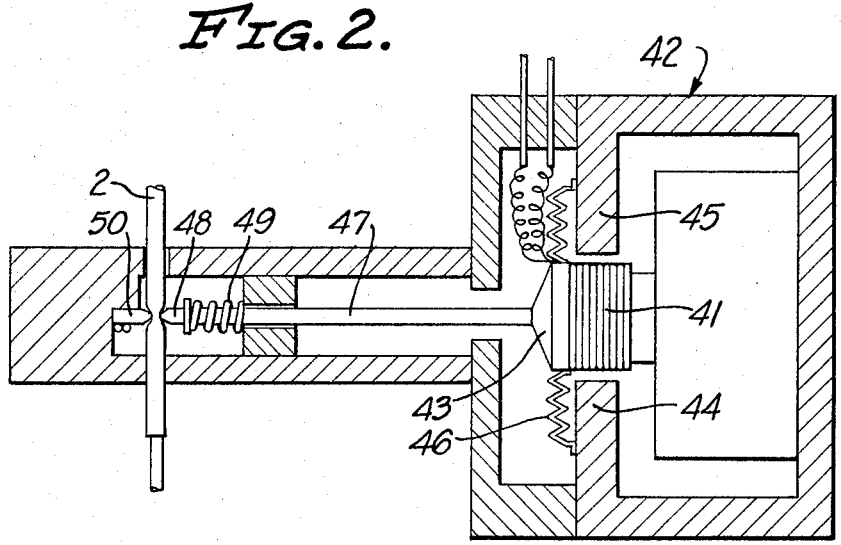

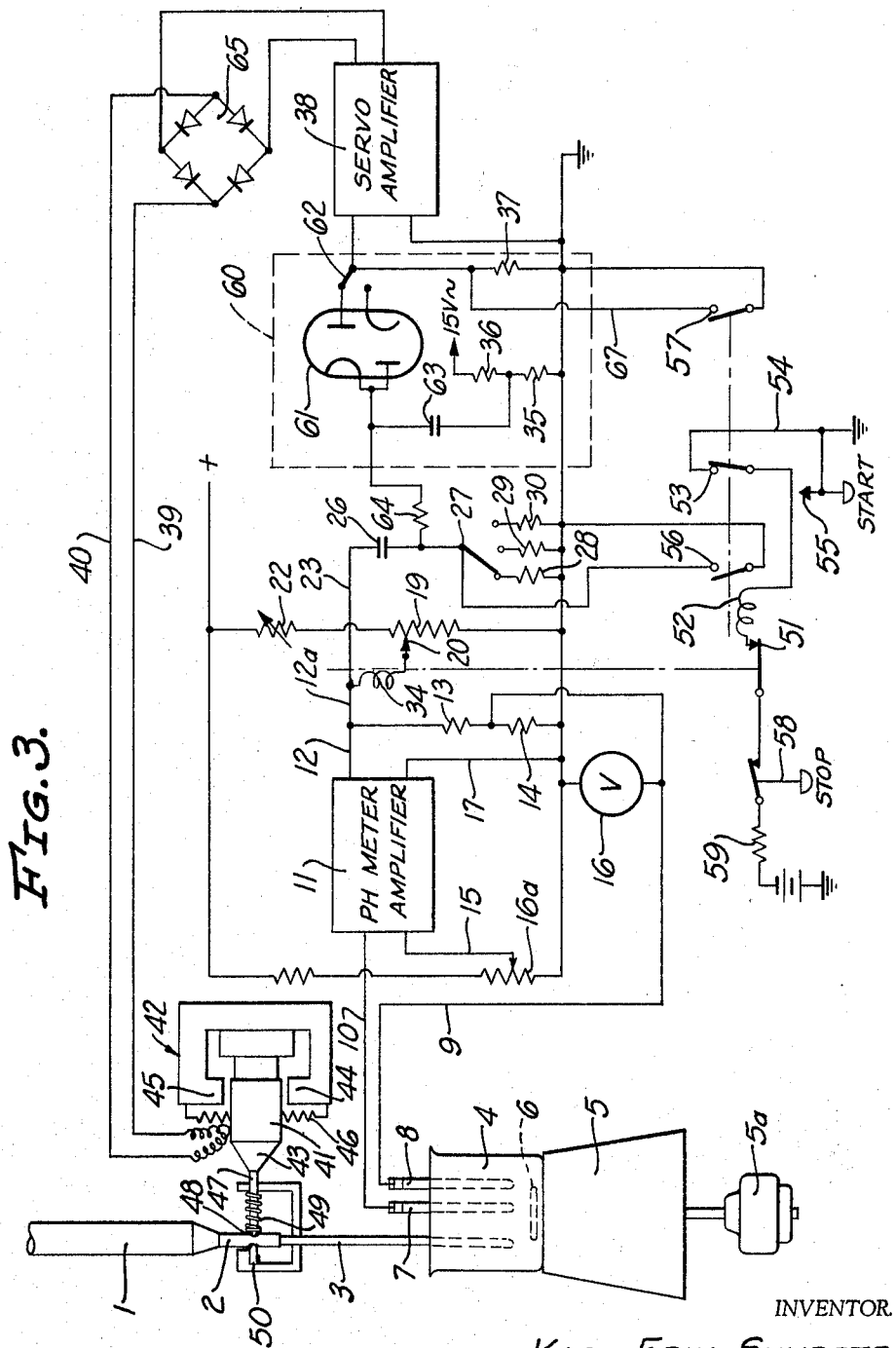

United States Patent Office
3,266,504
Patented August 16, 1966

3,266,504
AUTOMATIC TITRATOR
Karl Erik Sundstrom, 411 N. College St., La Habra, Calif.
Filed Oct. 15, 1962, Ser. No. 230,447
13 Claims. (Cl. 137—3)

The invention is related to an automatic titrator in which the rate of titrant delivery is continuously being changed during the titration by a servo system.

Automatic titrators of this general type are known. However, in this type of titrator it is necessary for a proper operation to adjust them in each individual case to the requirements of the particular type of titration at hand. In many cases, this specific adjustment requires considerable time, furthermore, the change of the parameters of the apparatus to the specific requirements is in many cases bothersome.

It is an object of the invention to overcome these disadvantages by providing a titration apparatus with a servo system that automatically adjusts itself to the requirements of any specific type of titration to be performed.

It is an object of the invention to provide a titrator for automatic control of titration rate and including titrant feed means for delivering titrant to a sample at a variable rate, electrode means for generating an output signal varying as a function of the sample-titrant mixture condition, a signal differentiator circuit with the output signal connected as an input thereto, a modulator circuit having a logarithmic output characteristic with the output of the differentiator circuit connected as an input thereto, and amplifier means for controlling the feed means with the output of the modulator circuit connected as an input thereto.

It is another object of the invention to provide an automatic titrator of the type in which the titration speed is continuously changed by a servo system and in which the indication of the equivalent end point is determined potentiometrically by two electrodes that are submerged in the sample solution and which are connected to a vacuum tube voltmeter whereby the latter in the first place supplies the pair of electrodes with a voltage that is equal and opposite to the signal voltage, and in the second place supplies a low output impedance voltage for the servo system that determines the titration speed, which titrator is characterized in that the output voltage of the vacuum tube voltmeter is connected to a differentiator circuit, the output voltage of which is connected to a logarithmic modulator that in turn controls a servo amplifier for the control of the delivery rate of titrant to the sample solution so that each tendency of the sample towards a quick change of the indicated potentiometric condition causes a functionally dependent countereffect so that the over-all change in electrode potential takes place at a rate that may be selected in advance.

The sample to be analyzed is a liquid solution. A titration takes place in such a way that to the solution having an unknown content of the constituent to be analyzed, a titrant solution of known titer or a so-called standard solution is added under observation of certain properties of the sample solution, for instance, the pH value in case of the so-called acid-base titration. The solution to be determined may, for instance, be sulfuric acid whereas the standard solution may be sodium hydroxide or the relationship may be the reverse. At a pH of 7 the titration is ended, that is the equivalent end point is attained and the amounts of acid and base in the titration vessel are equivalent to one another. The pH value is usually observed by means of a pH sensitive color indicator or, in cases where the color of the solution itself makes this indication impossible, the end point is determined by other means, for instance, such as by a pH meter.

Automation of this titration process means that the adding or delivery of standard solution and also the indication of the end point to be attained and the stopping of the delivery at the attainment of the end point takes place automatically.

The difficulties for the automation of the titration are essentially a consequence of the very sudden changes in condition that are being indicated by the concentration-sensitive indication device when the titration process approaches the end point. The accuracy of the result of the titration and the duration of the titration are in this respect conflicting requirements. The rapid changes in the vicinity of the equivalent end point require a low titration speed whereas as a result of the relatively large amount of liquid that is required for the attainment of the equivalent end point the titration speed should be relatively large in order to allow performing of the titration within a relatively short period. The position of the equivalent end point and the speed or rate of change in the vicinity of the equivalent end point, however, are different from case to case. Accordingly, the difficulties in meeting the requirements that are to be put on an automatic titration apparatus are, therefore, extremely high.

Two exemplary embodiments of a titration apparatus according to the invention are described in the following detailed description in conjunction with the figures:

FIG. 1 shows the circuit diagram of a titrator according to a first embodiment of the invention;

FIG. 2 shows, on a larger scale, a valve device of a titrator according to the invention; and FIG. 3 shows the circuit diagram of a second embodiment of a titrator according to the invention.

In the embodiment of FIG. 1 a burette 1 contains a solution of known concentration of titrant or standard solution. The burette 1 is provided with division marks so that the delivered amount of standard solution can be read. During the titration, titrant flows through the rubber tube 2 and a glass tube 3 in the beaker or titrant vessel 4 that contains the sample or solution to be titrated, a constituent of which has to be determined. A magnetic stirrer 5 is provided having a strong permanent magnet that may be brought to rotation by means of an electric motor 5a. A magnetic rod 6 is disposed in the titration vessel 4 and is rotated by the magnet.

The titration vessel also contains two electrodes 7 and 8. Electrode 8 is a reference electrode that serves to provide a potential that is independent of the specific type of solution and the concentration of the sample solution, whereas the measuring electrode 7 has the purpose to provide a potential that is functionally related to a condition of the sample solution. The measuring electrode 7 is connected through the lead 10 to the input terminal of a vacuum tube voltmeter 11 whereas the reference electrode 8 is connected through the lead 9 and through the resistor 13 to an output terminal 12 of the vacuum tube voltmeter. The resistor 13 together with the grounded resistor 14 constitutes a potential divider. The second input terminal of the vacuum tube voltmeter 11 is connected with the potentiometer 16a through the lead 15, the potentiometer 16a being connected to a stabilized constant direct current voltage. The potentiometer 16a serves for the standardizing or zeroing of a device 16 for indication of the potential difference between the electrodes 7 and 8 to be achieved at the equivalent end point. The second output terminal of the tube voltmeter 11 is grounded through the lead 17. The indication device 16, a voltmeter, is connected between the lead 9 and ground.

The coil of a sensitive relay 34 is connected between the output terminal 12 of the vacuum tube voltmeter 11 and the tap terminal 20 of a potentiometer 19. The potentiometer 19 is grounded through the lead 21 and is, furthermore, connected through the variable resistor 22 to a regulated source of direct voltage. By means of the variable resistor 22 the voltage to be supplied to the potentiometer 19 may be set at any desired value. A relatively small amount of the voltage between the output terminals of the tube voltmeter is applied to a potential divider comprising the two resistors 13 and 14 and this voltage is fed back via the lead 9, the reference electrode 8 and the sample solution to the measuring electrode 7 and from this electrode to the input terminal of the vacuum tube voltmeter 11 through the lead 10. The potential that is supplied by the lead 9 is measured by the voltmeter 16.

A lead 23 connects the potential divider 13 and 14 to the control grid of a tube (triode) 24. An anode resistor 25 and a capacitor 26 are connected in the anode circuit of this tube. The anode resistor 25 is also connected to an anode voltage source that supplies a stabilized constant voltage the positive terminal of which is indicated in the figure by a + sign. By means of a selector switch 27, a capacitor 26 may be connected to ground through either one of three or more resistors 28, 29 or 30. A lead 31 connects the capacitor 26 to a vacuum tube 32. This tube 32 is a so-called exponential vacuum tube, that is, a tube with variable amplification factor $\mu$. The cathode of the tube 32 is connected by a lead 33 to a tap of a potential divider that comprises the resistors 35 and 36. This potential divider 35, 36 is connected between ground and a heater winding of a power supply transformer. A load resistor 37 is connected between the anode of the vacuum tube 32 and ground. The anode is, furthermore, connected to the input terminal of a servo amplifier 38 the other input terminal of which is connected to ground.

Vacuum tube 24, condenser 26 and the resistor 28 operate as a differentiator or differential circuit for that potential that is fed back by the lead 9 to the reference electrode 8 which is measured from the voltmeter 16. As a result of the potential generated by the differentiator a potential is generated across the resistor 28 that controls the vacuum tube 32 which functions as a logarithmic modulator controlled by the voltage drop on resistor 28. This logarithmic modulator in turn controls the servo amplifier 38. A magnet valve 42 is connected to the output terminals of the servo amplifier 38 by the leads 39 and 40.

The valve 42, as shown in FIG. 2, contains a controlling portion comprising a vibrator system having a permanent magnet and a valve portion comprising a simple clamp device for the rubber tube 2. The coil 41 is mounted on a coil holder 43 that is movable within the magnetic field. The coil holder 43 in turn is mounted on the pole pieces 44 and 45 by means of a resilient centering device 46 in the form of a membrane. A rod 47 is mounted in the central part of the coil holder 43 and projects therefrom in the direction of the oscillatory motion of the coil, said rod 47 ending in a blunt knife edge-like final portion 48. A compression spring 49 is mounted around the rod 47. The knife edge 48 of the rod 47 is pushed downwards to a stationary support 50 by means of the spring 49 so that the tube 2 is normally squeezed and closed by the pressure exerted between the knife edge formed on the rod 47 and said stationary support 50.

The sensitive relay 34 controls a contact 51 that in turn closes a circuit through the coil of a second relay 52. The coil of the relay 52 is in circuit with a resistor 59, a pushbutton switch 58, the contact 51 belonging to the relay 34, the coil of the relay 52, the contact 53 of the relay 52 and a grounded lead 54. The contact 53 is operated by a pushbutton switch 55 for starting the titration period. The relay 52 controls two further contacts 56 and 57. The contact 56 enables a quick discharge of the capacitor 26 by short circuiting the same through around the resistors 28, 29 or 30. By means of contact 57, the input of the servo amplifier 38 can be shorted so that a signal coming from the logarithmic modulator cannot open the valve 42 as long as contact 57 remains closed.

The titration apparatus as described thus far, operates as follows:

It is supposed that burette 1 is filled with a suitable standard solution, for instance, 0.1 normal sodium hydroxide and that the titration vessel 4 contains a certain amount of solution to be analyzed, for instance, about 0.1 normal $H_3PO_4$ solution. The magnetic stirrer 5 is put in motion. This results in a strong stirring motion by the magnetic stirrer rod 6, performed in the sample solution. A certain voltage exists between the electrodes 7 and 8 that can be read on the dial of instrument 16, the instrument in this case being preferably calibrated in pH units instead of volts. The potentiometer 19, a dial of which preferably is also calibrated in pH units is adjusted to the desired pH value, for instance, pH=8.9. Between the output terminal 12 of the vacuum tube voltmeter 11 and the sliding contact 20 of the potentiometer 19, a potential difference exists that generates a current through the relay 34 so that contact 51 is closed.

The starting knob 55 is now operated by hand. The relay 52 now becomes energized through the resistor 59, the contact of the stop pushbutton 58, the contact 51 and the contact for the starting knob 55 so that the contact 53 of the relay 52 is closed and the relay 52 now holds itself in the energized state. In case relay 52 is energized, the contacts 56 and 57 are opened. As a result thereof, the servo amplifier 38 goes to its saturation voltage because of the output voltage of the logarithmic modulator 60 that contains the vacuum tube 32. The output current of the servo amplifier 38 energizes the coil 41 of the valve 42 so that the coil that supports the rod 47 begins to reciprocate. As a result of this reciprocating movement, the knife edge portion 48 of the rod 47 alternately opens and closes the rubber tube 2. During each interval in which the tube is open, titrant flows from the burette through the rubber tube 2 and the glass tube 3 into the titrant vessel 4 and is thoroughly mixed with the solution to be analyzed by the stirrer. The titrant solution thereby starts neutralization of the sample to be analyzed which causes a change of the output voltage of the measuring electrode 7. As a result thereof the voltage between the input terminals of the vacuum tube voltmeter 11 is changed which in turn causes a change of the voltage between the output terminals which voltage, however, is considerably larger because of the amplification in the vacuum tube voltmeter 11.

A feedback potential is applied through the lead 9 in such a fashion that because of the beginning neutralizing of the sample solution and the voltage change of the measuring electrode 7 resulting therefrom is opposed by an almost equal potential change having the opposite sign that is applied through the lead 9 to the reference electrode 8; as a result thereof, the potential between the input terminals of the vacuum tube voltmeter is kept approximately constant and the potential change on the measuring electrode can be read on the instrument 16 and leads to potential changes in voltage drop across resistor 14. The change of the voltage drop of the resistor 14 results, via the load resistor 25, in an amplified change in output voltage of the vacuum tube 24 which switches off the logarithmic modulator 60 through the capacitor 26, the lead 31 and the vacuum tube 32. This, however, results in interruption of the alternating current voltage that opened the valve 42 by means of the servo amplifier 38. The capacitor 26 is charged in the meantime through the resistor 28 so that the voltage that closed the modulator 60 is not maintained. This voltage is compensated by a voltage that is determined by the time constant of the RC combination 26, 28, and by the charge that is developed on the condensor 26 as a result of the charge current that flows through the resistor 28, so that the modulator 60 again begins to generate an input potential to the servo amplifier 38 which in turn causes the valve 42 to open and causes the titrant to flow in the titrant vessel 4.

For all practical purposes, the delivery of titrant is continuous in view of the high number of opening and closing cycles per second determined by the power line frequency which determines the output frequency of the servo amplifier. The modulator 60 is never completely shut off by the voltage drop of the resistor 28. Consequently, the titration takes place continuously and the direct voltage of the measuring electrode is continuously changed so that also the direct current voltage on the control grid of the vacuum tube 24 is changed in a continuous fashion. Accordingly, the voltage of the anode of this vacuum tube is changed continuously throughout the entire titration process. The change in voltage on the anode of the vacuum tube 24 corresponds to the change in charge of the capacitor 26 which takes place through resistor 28. In the absence of the changes in charge of capacitor 26, the modulator 60 would soon be entirely throttled and the titration process would be interrupted.

The speed with which the titration process takes place is determined by the charge time of the capacitor 26 through resistor 28. By using a resistor 29 or 30 that have different values of the resistance, the duration of the titration can be selectively determined. In case the output potential of the electrode 7 undergoes rapid changes as a result of the addition of titrant a quick change of the potential at the control grid of modulator vacuum tube 32 results, so that modulator 60 delivers a lower potential to the servo amplifier 38, the latter controlling the valve 42 for the control of the rate of flow of titrant solution. As a result thereof, large changes in potential in response to a certain delivery rate of the titrant result in a decrease of the titrant delivery rate. In this manner, the speed of titration, that is the amount of titrant that is delivered per unit of time, is automatically adjusted so that the reaction of the sample solution itself in response to the addition of titrant determines the speed of titration.

It is necessary that the modulator 60 that contains the vacuum tube 32 has a logarithmic characteristic so that the output voltage of the modulator 60 is a logarithmic function of the voltage that controls this modulator. It is to be noted that the output potential of the electrode 7 changes very rapidly when the equivalent end point is approached in response to the delivery of titrant from the burette 1 as is the case in most titrations. The change in voltage of the electrode 7, which is a function of the throttling action of the valve, is consequently very large and the entire system could very easily start to oscillate. In this case, a small addition of titrant solution would cause a large change in potential that would block the modulator entirely for a while so that each addition of titrant would be interrupted until the modulator 60 is energized again after the change in voltage of the input of the modulator 60 has had the time to be brought back to normal as a result of the discharge of capacitor 26 through resistor 28. However, because of the logarithmic characteristic of the modulator the controlling voltage never blocks the modulator entirely as a result of the control voltage being applied thereto through resistor 28. Instead, the operation point is shifted in such a way that the additional amount of titrant which causes a quick change of the potential of the electrode 7 causes the modulator to shift its operation point to an area in which its output potential is relatively small so that the rate of change of the potential at the input also remains small.

During the titration, the potential of the electrode 7 is changed and, therefore, also the voltage drop across resistor 14 and the voltmeter 16 changes. The titration speed is automatically controlled in such a way that the voltage drop on resistor 14 changes approximately linearly with respect to time.

The voltage drop across resistor 14 constitutes a part of the potential between the output terminals of the vacuum tube voltmeter 11. At a predetermined output potential of the vacuum tube voltmeter, corresponding to a certain pH value, current is no longer supplied to the relay 34. This is so when the output voltage of the vacuum tube voltmeter equals the potential that has been preselected by means of the sliding contact 20 on the potentiometer 19. When current is no longer supplied to the relay 34, the contact 51 is opened so that the relay 52 that controls the contacts 56, 53 and 57 is de-energized. This results in the closing of contact 56 so that capacitor 26 is grounded. This again results in the blocking of the input of servo amplifier 38 so that the titration process is terminated, current being no longer supplied to the coil of valve 42.

Furthermore, the possibility exists to interrupt the titration process manually if desired. Then the end stop pushbutton 58 is pushed in so that the energizing current to the relay 52 is interrupted which results in stopping of the titrant delivery. Therefore, the contact of 58 enables the interruption of the titration process independent of the value indicated by the dial instrument 16. In case the value that is indicated by the voltmeter 16 is different from the value that is selected by means of potentiometer 19, the relay 34 is energized and closes contact 51 whereas the energizing current of the relay 52 is only closed when the start pushbutton 55 is operated which results in supplying energizing current to the relay 52 whereupon contact 53 is closed so that holding current is supplied only through this contact.

After the titration process has been terminated in the manner described, the amount of titrant is read at the burette from which the concentration of the sample solution is determined. The titration process is thereby completed.

In the embodiment according to FIG. 3, a unilaterally conducting device 65 is connected to the output circuit of the servo amplifier 38. This unilaterally conducting device 65 delivers a D.C. current for the operation of the valve 42. A double diode 61 of the modulator 60 is operated by means of the reversing switch 62 in such a manner that either one or the other of the two diode halves is connected in circuit in the system so that the current through the diode 61 which is delivered to the input terminals of the servo amplifier 38 through the capacitor 26 becomes dependent on the polarity of the voltage on the resistor 28. In this manner, for instance, switch 62 should be operated in such a way that it connects to the anode of the diode that conducts current when the titration goes in a direction in which the potential on the resistor 28 increases and becomes positive with respect to the voltage of the anode which is connected through resistor 37 to ground. In case we have an increasing positive potential on the cathode relative to the anode the current that flows through the diode is increased according to the logarithmic characteristic of the space current discharge. This, in turn, causes the modulation current to be decreased, the alternating current being superimposed upon the direct current that flows because of the cathode potential. An A.C. voltage drop exists between the terminals of the resistor 64 caused by the current through the capacitor 63.

The differentiator circuit according to FIG. 3 is simplified and contains only the capacitor 26 and the resistor 28 with amplifier tubes 24, 32 omitted. However, in this case the vacuum tube voltmeter 11 has to deliver a higher output voltage on its output terminals 12 and 17.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a titrator for automatic control of titration rate and including titrant feed means for delivering titrant to a sample at a variable rate, and electrode means for generating an output signal varying as a function of sample-titrant mixture condition, the combination of:
- a signal differentiator circuit, with said output signal connected as an input thereto;
- a modulator circuit having a logarithmic output characteristic, with the output of said differentiator circuit connected as an input thereto; and
- amplifier means for controlling said feed means, with the output of said modulator circuit connected as an input thereto.

2. A titrator as defined in claim 1 in which said differentiator circuit comprises:
- a resistance-capacitance circuit with a series capacitance and a shunt resistance; and
- an amplifier for driving said resistance-capacitance circuit and having said output signal as an input.

3. A titrator as defined in claim 1 in which said differentiator circuit comprises a resistance-capacitance circuit with a series capacitance and a shunt resistance and with a variable value of resistance.

4. A titrator as defined in claim 1 in which said modulator circuit comprises:
- an amplifier tube having a variable amplification factor with said differentiator circuit output connected to the grid thereof and with the plate thereof providing said modulator circuit output; and
- means for connecting an A.C. voltage to the cathode of said tube for modulating the output thereof.

5. A titrator as defined in claim 1 in which said modulator circuit comprises:
- a serially connected rectifier having an input and an output and with said differentiator circuit output connected to said rectifier input; and
- means for connecting an A.C. voltage to the input side of said rectifier for modulating the output thereof.

6. In a titrator for automatic control of titration rate and including a source of titrant and electrode means for generating an output signal varying as a function of sample-titrant mixture condition, the combination of:
- flexible conduit means for conducting titrant from said source to the sample;
- a reciprocating valve member for compressing said flexible conduit means to vary the flow of titrant therethrough;
- spring means for urging said valve member to the conduit closed position;
- an electromagnet for urging said valve member in the opposite direction against the action of said spring means;
- a signal differentiator circuit, with said output signal connected as an input thereto;
- a modulator circuit having a logarithmic output characteristic, with the output of said differentiator circuit connected as an input thereto; and
- an amplifier for energizing said electromagnet and reciprocating said valve member as a function of said output signal, with the output of said modulator circuit connected as an input to said amplifier.

7. In a control circuit for the automatic change of the titration velocity in an automatic titrator having two electrodes that are to be dipped in the sample solution and a voltmeter that is connected to the electrodes, the output of said voltmeter being connected to the electrodes and also with the control circuit, the combination of:
- a differentiator circuit having the output of said voltmeter connected thereto;
- a modulator circuit having a logarithmic characteristic and having the output of said differentiator circuit connected thereto; and
- a servo system driven by the output of said modulator circuit for controlling the delivery of titrant to the sample solution.

8. A control circuit as defined in claim 7 including an end point reference source comprising:
- a potentiometer connected across the voltage source;
- a switching circuit for shutting off titrant delivery; and
- means for connecting said switching circuit between the arm of said potentiometer and the output of said voltmeter, with the setting of said potentiometer arm determining the end point of the titration.

9. A control circuit as defined in claim 7 including:
- a potential divider connected across the voltmeter output;
- means for connecting one of said electrodes to a point on said potential divider;
- means for connecting the other of said electrodes to one input terminal of the voltmeter; and
- means for connecting the other input terminal of the voltmeter to an adjustable reference voltage.

10. A control circuit as defined in claim 7 in which said logarithmic modulator circuit includes:
- two diodes connected in parallel with the input from said differentiator circuit connected to the anode of one diode and to the cathode of the other diode;
- a reversing switch for selectively connecting the cathode of said one diode and the anode of said other diode as an input to said servo system; and
- a capacitor for connecting a modulating alternating current source to said input from said differentiator circuit.

11. A control circuit as defined in claim 7 in which said servo system includes:
- a flow control valve comprising a delivery tube, a permanent magnet, a rod carrying a coil positioned between poles of said permanent magnet, said rod having a knife edge, and a spring for urging said knife edge against said delivery tube; and
- an amplifier for energizing said coil and moving said edge away from said tube.

12. A method of automatically varying the rate of flow of titrant in a titration process, including the steps of:
- measuring the pH of the titrant-sample mixture;
- generating a control signal which varies as the logarithm of the differential of pH;
- modulating the control signal at a fixed amplitude and frequency to produce a modulated control signal; and
- varying the flow of titrant in direct relation to the modulated control signal.

13. The method as defined in claim 12 including the steps of:
- comparing the measured pH with a reference; and
- stopping flow of titrant when the measured pH corresponds to the reference.

References Cited by the Examiner

UNITED STATES PATENTS

| | | | |
|---|---|---|---|
| 2,726,670 | 12/1955 | Staunton | 137—93 |
| 2,770,531 | 11/1956 | Howes et al. | 23—253 X |
| 2,950,177 | 8/1960 | Brown et al. | 23—253 |

WILLIAM F. O'DEA, *Primary Examiner.*

DELBERT E. GANTZ, MARTIN P. SCHWADRON,
*Examiners.*

D. ZOBKIW, *Assistant Examiner.*